United States Patent
Ordonez

(10) Patent No.: US 7,761,450 B1
(45) Date of Patent: Jul. 20, 2010

(54) COMPUTING PERCENTAGES IN A DATABASE SYSTEM

(75) Inventor: Carlos Ordonez, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 1320 days.

(21) Appl. No.: 10/746,172

(22) Filed: Dec. 24, 2003

(51) Int. Cl.
*G06F 17/30* (2006.01)

(52) U.S. Cl. ..................................... 707/736

(58) Field of Classification Search ........... 707/1, 707/2, 3, 9, 10, 4, 736; 709/224; 379/133
See application file for complete search history.

(56) References Cited

U.S. PATENT DOCUMENTS

| | | | | |
|---|---|---|---|---|
| 5,812,840 | A * | 9/1998 | Shwartz | 707/4 |
| 5,926,807 | A * | 7/1999 | Peltonen et al. | 707/3 |
| 6,009,271 | A * | 12/1999 | Whatley | 717/127 |
| 6,094,651 | A * | 7/2000 | Agrawal et al. | 707/5 |
| 6,408,292 | B1 * | 6/2002 | Bakalash et al. | 707/2 |
| 6,721,405 | B1 * | 4/2004 | Nolting et al. | 379/133 |
| 2002/0138472 | A1 * | 9/2002 | Ricciardi | 707/3 |
| 2003/0105732 | A1 * | 6/2003 | Kagalwala et al. | 707/1 |

OTHER PUBLICATIONS

E. Baralis et al., "Materialized View Selection in a Multidimensional Database," VLDB Conference, pp. 1-10 (1997).
L. Fu et al., "CUBIST: A New Approach to Speeding Up OLAP Queries in Data Cubes," DOLAP Workshop, pp. 1-19 (May 2001).
J. Gray et al., "Data Cube: A Relational Aggregation Operator Generalizing Group-By, Cross-Tab, and Sub-Totals," ICDE, pp. 29-53 (1997).
A. Gupta et al., "Aggregate-Query Processing in Data Warehousing Environments," VLDB Conference, pp. 1-12 (1995).
J. Han et al., "Efficient Computation of Iceberg Cubes with Complex Measures," ACM SIGMOD Conference, pp. 1-12 (2001).
V. Harinarayan et al., "Implementing Data Cubes Efficiently," ACM SIGMOD Conference, pp. 1-25 (1996).
NCR Corporation, "Teradata® RDBMS SQL Reference—vol. 5, Functions and Operators," Release 3.0 Edition, pp. 109-274 (2001).

* cited by examiner

*Primary Examiner*—Etienne P LeRoux
(74) *Attorney, Agent, or Firm*—Trop, Pruner & Hu P.C.

(57) ABSTRACT

A database system includes a storage to store a table, and a controller to receive a query containing an aggregate function to calculate a percentage. In response to the aggregate function, the percentage is calculated. In one implementation, the controller calculates plural percentage values based on plural groups specified by a group-by clause of the query.

20 Claims, 2 Drawing Sheets

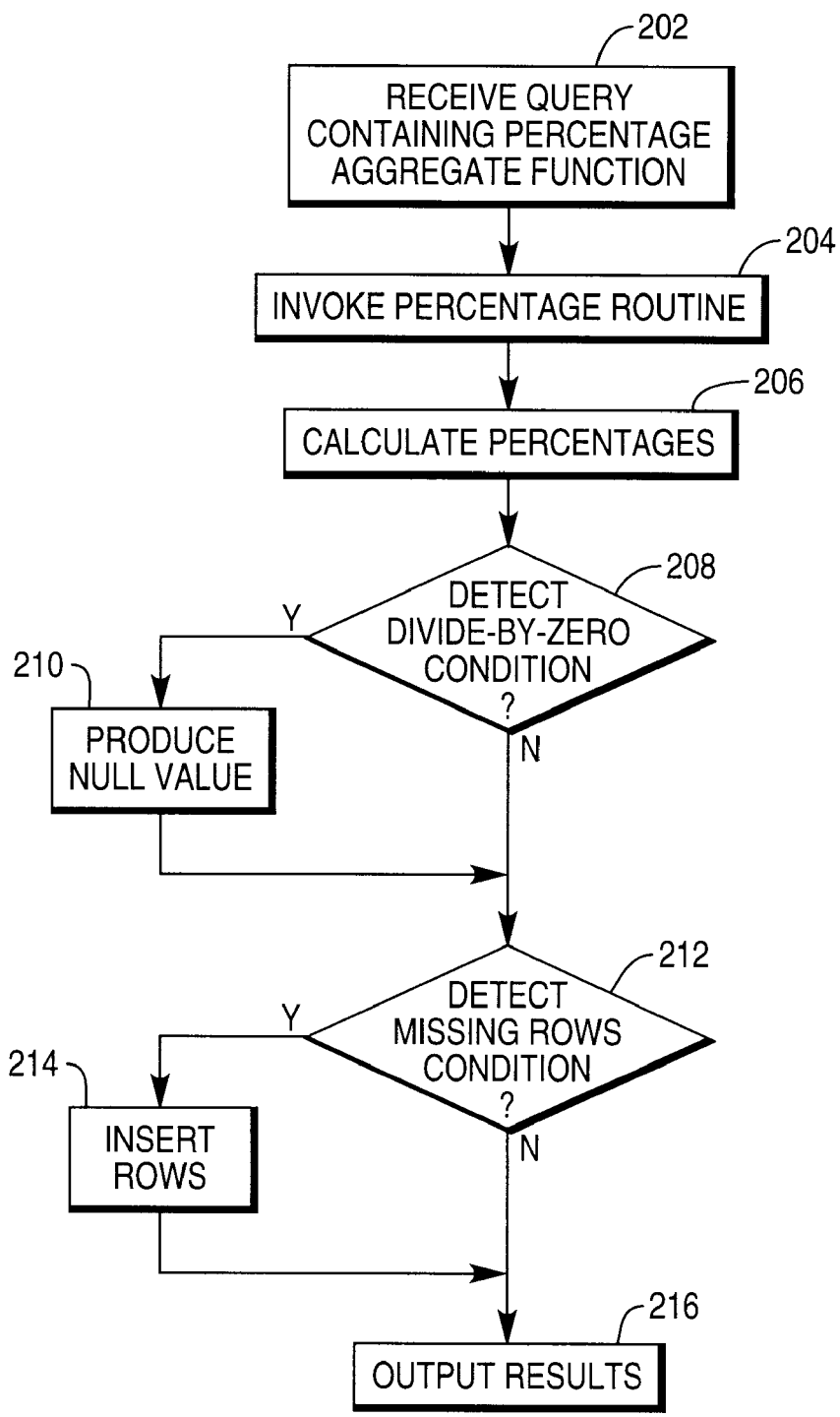

COMPUTING PERCENTAGES IN A DATABASE SYSTEM

BACKGROUND

A database is a collection of logically related data arranged in a predetermined format, such as in tables that contain rows and columns. To access the content of a table in the database, queries according to a standard database query language (e.g., Structured Query Language or SQL) are submitted to the database system. A query can be issued to insert new entries into a table of a database (suggest to insert a row into the table), modify the content of the table, or to delete entries from the table.

Examples of SQL statements include INSERT, SELECT, UPDATE, and DELETE. The SELECT statement is used to retrieve information from the database and to organize information for presentation to a user or to an application program. A SELECT statement can also include a GROUP BY clause, which specifies a grouping function to group output results according to specified one or more attributes (columns). In the ensuing discussion, the term "attribute" and "column" are used interchangeably. The output of the group-by operation is a set of groups of rows where each group is a set of rows that share a common value of the grouping attribute(s). The grouping attribute(s) are the attribute(s) specified in the GROUP BY clause.

As the technology of storage devices and database software have improved, the capacity of database systems have also increased dramatically. An application of database systems is data warehousing, where data from various sources are collected and stored in the data warehouse. The amount of data that can be stored in the data warehouse can be immense. To process information within such data warehouses, on-line analytical processing (OLAP) is typically performed. Usually, on-line analytical processing involves the calculation of aggregates on large data sets. Examples of aggregates include the calculation of a sum of values on a given attribute, the calculation of an average, the calculation of a minimum, the calculation of a maximum, the counting of a number of rows, and so forth.

Conventionally, a convenient mechanism has not been provided to enable the calculation of percentages using database queries. Typically, a user has to manually specify how the percentage is to be performed by using relatively complicated clauses in the database query, such as the OVER and PARTITION clauses proposed in the SQL-OLAP amendment by the American National Standards Institute (ANSI). Such clauses for calculating percentages are relatively complex to use, which may result in errors in calculating percentages if the user does not properly specify the clauses. Alternatively, a user can also combine traditional SQL aggregations for calculating percentages; however, this approach also results in complex queries that are unwieldy to a user. Another issue associated with conventional techniques of computing percentages is that divisions by zero result in errors.

SUMMARY

In general, a convenient mechanism is provided for calculating percentages in a database system. For example, a method for use in a database system includes receiving a database query that specifies an aggregate function for calculating a percentage. In response to the aggregate function, the percentage is calculated.

Other or alternative features will become apparent from the following description, from the drawings, or from the claims.

BRIEF DESCRIPTION OF THE DRAWING

FIG. 2 is a flow diagram of a process of calculating a percentage in the database system of FIG. 1, in accordance with an embodiment.

DETAILED DESCRIPTION

Figure 1:
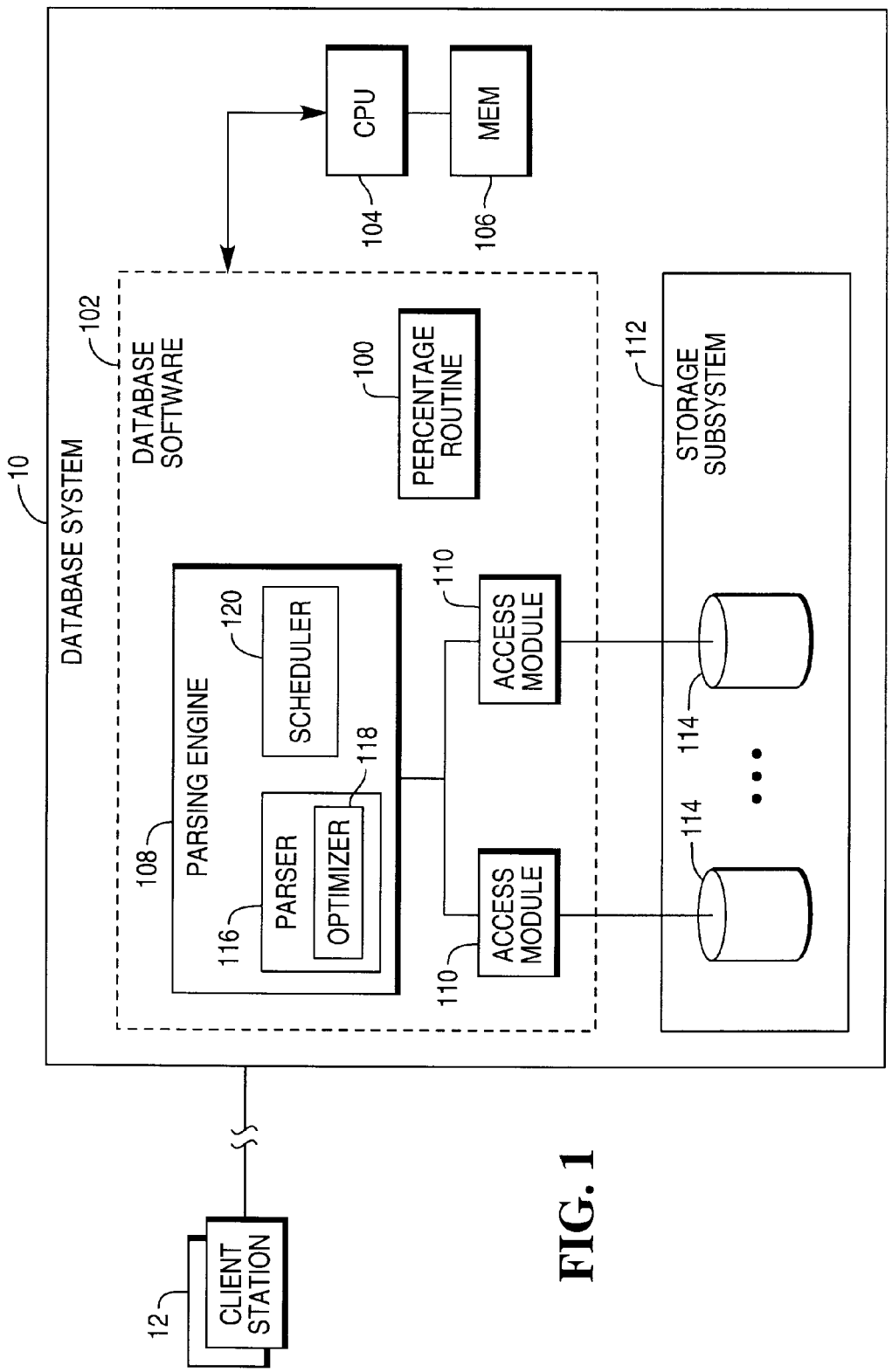
FIG. 1 is a block diagram of an example arrangement that includes a database system coupled to one or more client stations.

In the following description, numerous details are set forth to provide an understanding of the present invention. However, it will be understood by those skilled in the art that the present invention may be practiced without these details and that numerous variations or modifications from the described embodiments are possible.

In accordance with some embodiments of the invention, an aggregate function for calculating percentages can be specified in a database query. Such an aggregate function is referred to as a "percentage aggregate function." The percentage aggregate function is specified in a manner that is similar to other aggregate functions, such as SUM (for calculating a sum), MIN (for calculating a minimum), MAX (for calculating a maximum), AVG (for calculating an average), COUNT (for counting a number of rows), and so forth. The percentage aggregate function is relatively simple to use, with the user being able to specify the attributes (also referred to as columns) to be involved in the calculation of the percentage in arguments passed to the percentage aggregate function. In addition to its convenience and ease of use, the percentage aggregate function can also handle special situations, such as division by zero conditions, missing rows, and others. As a result, a convenient interface for a user is provided to enable the calculation of percentages when performing database operations, such as on-line analytical processing (OLAP), and other database operations.

FIG. 1 illustrates an example arrangement of a database system 10 that is capable of calculating percentages in response to percentage aggregate functions specified in database queries, such as SELECT statements according to the Structured Query Language (SQL). In other embodiments, the percentage aggregate function can be specified in other database queries.

The database system 10 includes a percentage routine 100 that is invoked in response to the processing of a query containing a percentage aggregate function. The percentage routine 100, in the illustrated embodiment, is part of database software 102 that is executable on one or more central processing units (CPUs) 104 in the database system. The one or more CPUs 104 are connected to system memory 106.

The database software 102 also includes a parsing engine 108 and access modules 110. The database system 10 in accordance with one embodiment of the invention is a parallel database system that includes multiple access modules 110 for concurrent access of data stored in a storage subsystem 112.

The storage subsystem 112 includes plural storage modules 114 that are accessible by respective access modules 110. Each access module 110 is capable of performing the following tasks: insert, delete, or modify contents of tables; create, modify or delete the definitions of tables; retrieve information from definitions and tables; and lock databases and tables. In one example, the access modules 110 are based on access module processors (AMPs) used in some TERRADATA® database systems from NCR Corporation.

The parsing engine 108 in the database software 102 includes a parser 116 that receives a query (e.g., an SQL query) from a user interface, such as a user interface in a client station 12 coupled to the database system 10 over a network. The parser 116 parses the query and checks the query for proper syntax. Based on the query, an optimizer 118 in the parser 116 selects a least cost access plan from multiple possible access plans for processing the query. The selected access plan contains steps that are to be performed by the access modules 110. A scheduler 120 in the parsing engine 108 sends the steps to the access modules 110 for execution. In response to these steps, the access modules 110 perform operations on data or data structures (e.g., tables, views, and so forth) stored in the storage modules 114 in the storage subsystem 112. If calculation of percentages is needed, then the percentage routine 100 is called by the access modules 110 for calculating the percentages. Note that multiple instances of the percentage routine 100 can be invoked for calculating percentages in different transactions in the database system.

The following sets forth an example SQL SELECT statement that specifies the percentage aggregate function (named "PERCENTAGE"):

SELECT C1, . . . , Ck, PERCENTAGE (A1 BY C1, . . . , Cj)
FROM F
GROUP BY C1, . . . , Ck;

The SELECT statement contains a GROUP BY clause to perform a group-by operation on grouping attributes C1, . . . , Ck. The table being accessed by the SELECT statement is table F, which can be a base table, an intermediate table containing a result of a join of plural tables, or other intermediate tables containing results of other database operations. The PERCENTAGE function, PERCENTAGE (A1 BY C1, Cj), contains the following arguments: A1 BY C1, Cj, where j<k. A1 represents any one of a numeric attribute from table F or an arithmetic expression. A1 is the parameter for which a percentage is to be calculated.

More generally, F is a relational table having a primary key represented by a row identifier (RID), k categorical attributes and p numerical attributes: F(RID, C1, Ck, A1, Ap). A categorical attribute is a column in the table F that has a finite number of values, not represented by a measure. Examples of categorical attributes include city, state, gender, and so forth. A numerical attribute is a column in the table F that is associated with a metric measure, such as height, sales volume, and so forth. In calculating a percentage aggregate on an attribute of table F, the table F is manipulated as a cube with k dimensions and p measures. Categorical attributes (dimensions) are used to group rows to aggregate numerical attributes (measures). Expressions involving measures are passed as arguments to the percentage aggregate function.

Effectively, the above SQL statement computes, for each group specified by the GROUP BY clause, the percentage produced by dividing the sum of the values of A1 in each group specified by the grouping attributes C1, C2, Ck by the sum of the values of A1 in each group specified by grouping attributes C1, C2, Cj, where j<k. The PERCENTAGE function returns a real number between 0 and 1, or a null value for division by zero or division by null values.

Although the BY clause in the argument list of the PERCENTAGE function is a required clause, the GROUP BY clause in the SELECT statement is optional. The GROUP BY clause specifies grouping based on the grouping attributes of the GROUP BY clause, and the BY clause in the PERCENTAGE function specifies grouping based on grouping attributes in the BY clause.

Without the GROUP BY clause, the PERCENTAGE function performs the following calculations: (1) the PERCENTAGE function sums all the values of the attribute A1 in all of the rows of table F; and (2) for each row, the PERCENTAGE function calculates the percentage of the corresponding value of A1 over the summed total. The percentage result is output for each row in table F.

The PERCENTAGE function performs two levels of aggregation: (1) summing of the parameter A1 based on k columns in the GROUP BY clause, and (2) summing of the parameter A1 based on the j columns in the BY clause of the PERCENTAGE function. For each group specified by the k grouping attributes in the GROUP BY clause, a first sum of the values of attribute A1 is calculated. Note that multiple first sums are calculated for the corresponding groups specified by the k grouping attributes. Also, for each group specified by the j (j<k) grouping attributes in the BY clause of the PERCENTAGE function, a second sum of the values of the attribute A1 is also calculated. Note that multiple second sums are calculated for corresponding groups specified by the j grouping attributes. Next, a division of the first sum by the second sum is calculated to derive percentages for the groups specified by the k grouping attributes.

According to one implementation, a table Fp is used to store the results of percentage queries. Also, the first sums (based on the k columns) are stored in a first temporary table Fk, and the second sums (based on the j columns) are stored in a second temporary table Fj. Both Fk and Fj can be computed directly from the original table F. Alternatively, Fj is first calculated from the original table F, with Fk calculated from Fj. If Fj is much smaller than F, then substantial database system resources can be conserved in calculating Fk.

The content of Fk are divided by the content of Fj to calculate the desired percentages. The calculated percentages are stored in Fp. Two alternative strategies can be employed in calculating such percentages.

In the first strategy, the percentages are computed by joining Fj and Fk on their common subkey C1, . . . , Cj, dividing their corresponding A1 values, and inserting the results into the third table Fp, according to the following statement:

INSERT INTO $F_p$
SELECT Fk.C1, . . . , Fk.Ck,
CASE WHEN Fj.A1< >0 THEN Fk.A1/Fj.A1 ELSE NULL END
FROM Fj, Fk
WHERE Fj.C1=Fk.C1, . . . , Fj.Cj=Fk.Cj;

In a second strategy, the percentages can be obtained by directly dividing Fk.A1 by the totals in Fj.A1, joining on C1, . . . , Cj, as set forth below:

UPDATE Fk
SET A1=CASE WHEN Fj.A1< >0 THEN Fk.A1/Fj.A1 Else Null End
WHERE Fk.C1=Fj.C1, . . . , Fk.Cj=Fj.Cj;

In this case, the temporary table Fk becomes Fp.

The above describes the case where there is only one PERCENTAGE term in the database query. More generally, the case where there are m (m>1) PERCENTAGE terms in the database query is discussed below:

SELECT C1, . . . , Ck,
PERCENTAGE($Ai_1$ BY $I_l$), . . . , PERCENTAGE($Ai_m$ BY $I_m$)
FROM F
GROUP BY C1, . . . , Ck;

In the query above, $I_j \subseteq \{C1, \ldots, Ck\}$; in other words, $I_j$ is the set of dimensions to group rows for computing totals for the jth term. Also, the attribute $Ai_j$ is some measure of F, where $i_j \in \{C1, \ldots, Cp, 1 \leq j \leq m\}$.

Two optimizations can be applied based on a partial order on dimension groups $I_j$. The order of computation of Fj tables can be changed so that $I_j \subseteq I_{j'}$ for $j < j'$. If Fj and Fj' involves the same column then Fj can be computed from Fj' since Fj' is a partial aggregate of Fj. If $I_j = I_{j'}$ for $j < j'$ and $Ai_j \neq Ai_{j'}$, then both Fj and Fj' can be computed using a single temporary table aggregating $Ai_j$ and $Ai_{j'}$.

When the Fj tables are ready, Fk and F1, . . . , Fm are joined, pairing Fk and each Fj on their common subkey. Finally, Fp is created with either an INSERT or UPDATE statement joining the m+1 tables in an analogous manner to the one-term case. In the above computations, coarse aggregations are based on finer aggregations to enhance efficiency. In other words, small groups of rows are aggregated to obtain larger groups of rows instead of computing aggregations directly from a base table (e.g., F), which can be quite large.

The calculation of percentages in accordance with some embodiments is further described in the context of an example, which involves a table STORESALES having the following content:

| TRANSACTION ID | STATE | CITY | SALES |
|---|---|---|---|
| 1 | CA | San Francisco | 13 |
| 2 | CA | San Francisco | 3 |
| 3 | CA | San Francisco | 67 |
| 4 | CA | Los Angeles | 23 |
| 5 | TX | Houston | 5 |
| 6 | TX | Houston | 35 |
| 7 | TX | Houston | 10 |
| 8 | TX | Houston | 14 |
| 9 | TX | Dallas | 53 |
| 10 | TX | Dallas | 32 |

The row identifier (RID) of the example table STORESALES is TRANSACTIONID. The table STORESALES has three columns STATE, CITY, and SALES. The following example statement is received by the database system 10 to calculate a percentage of sales (values contained in the SALES column) in each city based on total sales of the corresponding state:

SELECT STATE, CITY, PERCENTAGE (SALES BY STATE)
FROM STORESALES
GROUP BY STATE, CITY;

The output for the SELECT statement above is as follows:

| STATE | CITY | PERCENTAGE (SALES BY STATE) |
|---|---|---|
| CA | Los Angeles | 21.7% |
| CA | San Francisco | 78.3% |
| TX | Dallas | 57.1% |
| TX | Houston | 42.9% |

In the example above, the GROUP BY clause performs grouping on the columns STATE and CITY, which produces four groups for the example table above: (1) Los Angeles, Calif.; (2) San Francisco, Calif.; (3) Dallas, Tex.; and (4) Houston, Tex. The percentage output calculated for each group is the percentage of sales in the corresponding state. Thus, for the row corresponding to the Los Angeles, Calif. group, the 21.7% value represents the percentage of sales in Los Angeles based on total sales in California. Similarly, for the row corresponding to the Houston, Tex. group, the 42.9% value represents the percentage of sales in Houston based on total sales in Texas.

The result table above contains multiple rows, one for each group defined by the grouping attribute in the GROUP BY clause (STATE, CITY). The percentage value contained in each row represents a percentage that is computed by the division of two sums: (1) a first sum of the values of the attribute SALES specified in the PERCENTAGE clause for the corresponding group (defined by the grouping attributes in the GROUP BY clause); and (2) a second sum of values for a group defined by the grouping attribute in the BY clause (STATE). The first sum is divided by the second sum to compute the percentage for the row.

The rows in the result table for each group defined by the grouping attribute(s) in the BY clause contain percentage values that add up to 100%. In the example above, the BY clause specifies two groups (based on the grouping attribute STATE): CA and TX. The two rows in the CA group contain percentage values that add up to 100% (21.7%+78.3%), and the two rows in the TX group contain percentage values that add up to 100% (57%+42.9%).

The following provides further examples of how the PERCENTAGE function can be used. Two tables, EMPLOYEE and SALES, are defined as follows:
    CREATE TABLE EMPLOYEE(EMPLOYEEID, NAME, GENDER, MARITALSTATUS, EDUCATION, PROJECTS, SALARY)
    PRIMARY INDEX(EMPLOYEEID);
    CREATE TABLE SALES(BASKETID, ITEMID, DAYOFWEEK, MONTHNO, STORED, CITY, STATE, DEPARTMENT, ITEMQTY, SALESAMT)
    PRIMARY INDEX(BASKETID, ITEMID);
The following SQL statement specifies the calculation of the percentage of sales for each state in each department:
    SELECT DEPARTMENT, STATE, PERCENTAGE (SALESAMT BY DEPARTMENT)
    FROM SALES
    GROUP BY DEPARTMENT, STATE;
The following statement calculates the percentage of sales for every state in each department:
    SELECT DEPARTMENT, STATE,
    PERCENTAGE(SALESAMT BY DEPARTMENT),
    PERCENTAGE(SALESAMT)
    FROM SALES
    GROUP BY DEPARTMENT, STATE;
The following statement calculates the percentage of employees by gender:
    SELECT GENDER, PERCENTAGE(GENDER)
    FROM EMPLOYEE
    GROUP BY GENDER;
The following statement calculates the percentage and maximum salary by gender:
    SELECT GENDER, PERCENTAGE(SALARY),
    MAX(SALARY)
    FROM EMPLOYEE
    GROUP BY GENDER;
The following statement calculates the sales contribution percentage by store:
    SELECT STORED, PERCENTAGE(SALESAMT),
    AVG(SALESAMT)
    FROM SALES
    GROUP BY STORED;
The following statement calculates the percentage of sales by state for each day/store, and the percentage of sales by day for each state/store:
    SELECT STATE, DAYOFWEEK, STORED,
    PERCENTAGE(SALESAMT BY STATE),
    PERCENTAGE(SALESAMT BY DAYOFWEEK),
    SUM(SALESAMT),

MAX(SALESAMT),
FROM SALES,
GROUP BY STATE, DAYOFWEEK, STORED;

As illustrated in the above examples, other aggregate functions, such as SUM, AVG, and so forth, can be specified in the same query as the PERCENTAGE aggregate function. Also, more than one PERCENTAGE aggregate function can be specified in one query.

Two special cases are addressed by the percentage routine 100 (FIG. 1) when invoked by the percentage aggregate function in a database query. The first special case is the case of missing rows, and the second special case is division by zero. Missing rows occurs when there are no rows for some group based on the k group-by attributes specified in the GROUP BY clause of the SELECT statement. In other words, some cell of the k-dimensional cube has no rows. The resulting percentage should be zero; therefore, no output normally appears since there is no result row. An example of this involves a query that seeks the sales percentages for all days of the week for a particular store. However, there may be zero transactions for some day of the week for the store. Because zero transactions occurred on that day, a query seeking the sales percentage for each day of the week will not output results for the day with zero transactions. If the results are provided in a graph (or other like output), then no output will be provided in the graph for the day with no sales transactions. Also, if the results are output to other tool, then the receiving tool may return an error if the tool detects a non-existent output for a particular group.

There are two options to address this issue. The first option is to perform pre-processing, where rows are inserted into the table F, one per missing group as provided by the GROUP BY clause. If the table F is a spool containing the join of two or more other tables, then the additional row(s) can be added during the join operation. Inserting rows addresses the problem for measures, such as salary, quantity, and so forth, but inserting rows may cause table F to produce an incorrect number of rows for the PERCENTAGE— function. Also, this option may make query evaluation inefficient if there are many grouping columns.

The second option is to perform post-processing, where missing rows are inserted into the final result table. A user may pick which option to use by adding an optional clause in a query that specifies the PERCENTAGE function. The handling of missing rows is an optional feature that may not be implemented in some embodiments.

To handle the division by zero issue, the PERCENTAGE function outputs a null value whenever it detects that a value is to be divided by zero. A division by a null value also produces a null value.

FIG. 2 illustrates a process of calculating a percentage, in accordance with an embodiment. The database system 10 receives (at 202) a query that specifies the PERCENTAGE-function. In response to the query, the database system 10 invokes (at 204) the percentage routine 100 (FIG. 1) which calculates (at 206) the percentages specified by the received query.

The percentage routine 100 also detects (at 208) for a divide-by-zero condition. If a divide-by-zero condition is detected, the percentage routine 100 produces (at 210) a null output.

The percentage routine 100 further detects (at 212) for a missing rows condition. If such a condition is detected, the percentage routine 100 inserts rows (at 214) either into the input table (for pre-processing) or the output table (for post-processing). As discussed above, pre-processing or post-processing is selectable by a user in a database query. The percentage results, along with other output results, for the received query are then output (at 216).

Instructions of the various software routines or modules discussed herein (such as the database software 102, which includes the percentage routine 100, access modules 110, and parsing engine 108, and so forth) are executed on corresponding control modules. The control modules include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. A method for use in a multi-node database system, comprising: storing a plurality of built-in aggregate functions, including an aggregate function for calculating a percentage;

receiving a database query that specifies the aggregate function for calculating a percentage;

in response to the database query specifying the aggregate function, calculating the percentage;

generating a result table having plural rows in response to the database query, wherein calculating the percentage comprises calculating plural percentage values for storing in corresponding rows of the result table; and wherein receiving the database query comprises receiving a database query having a group-by clause specifying grouping attributes defining plural first groups, each of the rows of the result table corresponding to respective first groups.

2. The method of claim 1, wherein the aggregate function specifies at least one grouping attribute to define plural second groups, a number of the second groups being less than a number of the first groups, wherein calculating the percentage values comprises calculating the percentage values such that the percentage values contained in rows of each second group add up to 100%.

3. The method of claim 1, wherein calculating the percentage comprises invoking a routine to calculate the percentage, the method further comprising:
the routine handling a divide-by-zero condition without returning an error.

4. The method of claim 3, wherein the routine handles the divide-by-zero condition by returning a null value.

5. The method of claim 1, wherein the database query also specifies a group-by clause having one or more first grouping attributes, the method further comprising:
outputting results for plural groups defined by the one or more first grouping attributes, wherein calculating the percentage comprises calculating a percentage in each group.

6. The method of claim 5, wherein the aggregate function specifies one or more second grouping attributes, and wherein calculating the percentage in each group comprises dividing a sum of values of a first attribute in each group defined by the one or more first grouping attributes by a sum of values of the first attribute in each group defined by the one or more second grouping attributes.

7. The method of claim 6, wherein the one or more first grouping attributes comprise grouping attributes C1 through Ck, and wherein the one or more second grouping attributes comprise grouping attributes C1 through Cj, where $j<k$.

8. The method of claim 5, wherein the database query specifies access of a table, the method further comprising:
detecting a first one of the plural groups with no rows in the table; and
even though the first group has no rows in a base table, producing a value representing a calculated percentage for the first group.

9. The method of claim 1, wherein calculating the percentage comprises summing values of a first attribute to produce a sum total, and dividing a given value by the sum total to calculate the percentage.

10. The method of claim 9, wherein the database query specifies a group-by clause to define plural groups, wherein summing the values of the first attribute comprises summing the values of the first attribute in each of the plural groups.

11. An article comprising at least one storage medium containing a plurality of built-in aggregate functions, including an aggregate function for calculating percentage, and instructions that when executed cause a database system to:
receive a query that specifies an aggregate function to calculate a percentage; and
in response to the query that specifies the aggregate function, calculating a percentage;
generate a result table having plural rows in response to the query, wherein calculating the percentage comprises calculating plural percentage values for storing in corresponding rows of the result table; and
wherein receiving the query comprises receiving a query having a group-by clause specifying plural first groups, each of the rows of the result table corresponding to respective first groups.

12. The article of claim 11, wherein the aggregate function specifies at least one grouping attribute to define plural second groups, a number of the second groups being less than a number of the first groups,
wherein calculating the percentage values comprises calculating percentage values such that the percentage values contained in rows of each second group add up to 100%.

13. The article of claim 11, wherein calculating the percentage comprises invoking a routine to calculate the percentage, the instructions when executed causing the database system to further:
cause the routine to handle a divide-by-zero condition when calculating the percentage without returning an error.

14. The article of claim 11, wherein the query also specifies a group-by clause having one or more first grouping attributes, the instructions when executed causing the database system to further:
output results for plural groups defined by the one or more first grouping attributes, wherein calculating the percentage comprises calculating a percentage in each group.

15. The article of claim 14, wherein the aggregate function specifies one or more second grouping attributes, and wherein calculating the percentage in each group comprises dividing a sum of values of a first attribute in each group defined by the one or more first grouping attributes by a sum of values of the first attribute in each group defined by the one or more second grouping attributes.

16. The article of claim 15, wherein the one or more first grouping attributes comprise grouping attributes C1 through Ck, and wherein the one or more second grouping attributes comprise grouping attributes C1 through Cj, where $j<k$.

17. A multi-node database system comprising:
a storage to store a table and a plurality of built-in aggregate functions, including an aggregate function for calculating a percentage;
a controller to:
receive a query containing an aggregate function to calculate a percentage for an attribute in the table;
in response to the aggregate function, calculating the percentage;
generate a result table having plural rows in response to the query, wherein the percentage calculated by the controller comprises plural percentage values for storing in corresponding rows of the result table; and
wherein the query comprises a group-by clause specifying grouping attributes defining plural first groups, each of the rows of the result table corresponding to respective first groups.

18. The database system of claim 17, wherein the controller comprises database software.

19. The database system of claim 17, wherein the storage comprises plural storage modules, the table distributed across the plural storage modules, and
wherein the controller comprises plural access modules to access, in parallel, the plural storage modules.

20. The database system of claim 17, wherein the aggregate function specifies at least one grouping attribute to define plural second groups, a number of the second groups being less than a number of the first groups,
wherein the percentage values calculated by the controller contained in rows of each second group add up to 100%.

* * * * *